US010838635B2

(12) United States Patent
Griffith et al.

(10) Patent No.: US 10,838,635 B2
(45) Date of Patent: Nov. 17, 2020

(54) DEFERRED DISCLAIM OF MEMORY PAGES

(71) Applicant: International Business Machines Corporation, Armonk, NY (US)

(72) Inventors: Douglas Griffith, Burnet, TX (US); Sreenivas Makineedi, Round Rock, TX (US); Srinivasa Rao Muppala, Round Rock, TX (US); Evan Zoss, Austin, TX (US); Mathew Accapadi, Cedar Park, TX (US); Anil Kalavakolanu, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 49 days.

(21) Appl. No.: 16/295,106

(22) Filed: Mar. 7, 2019

(65) Prior Publication Data

US 2020/0285405 A1    Sep. 10, 2020

(51) Int. Cl.
*G06F 3/06* (2006.01)
*G06F 12/10* (2016.01)

(52) U.S. Cl.
CPC .......... *G06F 3/0631* (2013.01); *G06F 3/0604* (2013.01); *G06F 3/0644* (2013.01); *G06F 3/0673* (2013.01); *G06F 12/10* (2013.01); *G06F 2212/657* (2013.01)

(58) Field of Classification Search
CPC .... G06F 3/0604; G06F 3/0631; G06F 3/0644; G06F 3/0673; G06F 12/10; G06F 2212/657
See application file for complete search history.

(56) References Cited

U.S. PATENT DOCUMENTS

| | | | |
|---|---|---|---|
| 5,949,972 A | * | 9/1999 | Applegate .......... G06F 11/3644 711/154 |
| 6,256,657 B1 | | 7/2001 | Chu |
| 8,140,721 B2 | | 3/2012 | Sachedina et al. |
| 8,918,601 B2 | | 12/2014 | Woffinden |
| 2018/0307621 A1 | * | 10/2018 | Surti .................. G06F 12/1027 |

OTHER PUBLICATIONS

Anonymously;"Method and System for Implementing a Thread Safe Cache with LRU with Page Replacement Policy," IP.Com, Sep. 17, 2013. pp. 8.
IBM; "Scalable Paging Space Block Allocator for a Deferred Storage Computer Operating System," IP.Com, Oct. 28, 2003. pp. 2.
IBM;"Method and System for Reducing Overhead while Retrieving Group Memory Least Recently Used (LRU) Pages," IP.Com, Nov. 23, 2009. pp. 3.
V. Babka., "Memory Management with Huge Pages," Google, 2017. pp. 69.

* cited by examiner

*Primary Examiner* — Larry T MacKall
(74) *Attorney, Agent, or Firm* — Cantor Colburn LLP; David Quinn (57) ABSTRACT

Examples of techniques for deferred disclaim of memory pages are described herein. An aspect includes, based on freeing of a last allocation on a first memory page, placing, by a processor, the first memory page on a deferred disclaim list. Another aspect includes, based on freeing of the last allocation on the first memory page, setting, by the processor, a first hidden flag in a first page table entry corresponding to the first memory page.

18 Claims, 5 Drawing Sheets

DEFERRED DISCLAIM OF MEMORY PAGES

BACKGROUND

The present techniques relate to computer systems. More specifically, the techniques relate to the deferred disclaim of memory pages in computer systems.

A computer system may maintain two or more classes of workspace or addressing space (memory or storage). A first class of workspace is fast but relatively expensive. A second class of workspace is relatively slow, but cheaper than the first class of workspace. The first class of workspace can be volatile memory such as random access memory (RAM), while the second class of workspace can be a mass storage device such as a disk drive. There may be ten or more times as much of the second class of workspace available as compared to the first class in a typical computer system.

In order to operate relatively efficiently, a computer system may move instructions and data from the second class of workspace to the first class of workspace before a system processor operates on such instructions or data. A scheme to address memory within both classes of workspace is called virtual memory. Such an addressing scheme provides for a range of addresses larger than the addressable physical memory. Accordingly, a virtual memory page can be actually stored to either physical memory or to storage, which may correspond to the first class of workspace and the second class of workspace, respectively. A virtual memory page, if in the second class of workspace, may be marked in a table, and then transferred to physical memory when accessed by the processor. Transferring data between storage and physical memory may be an expensive operation.

A virtual memory page may be a fixed-size block of data. A virtual memory page can be resident in memory. Such a virtual memory page may be mapped to a location where the physical data is stored in physical memory. Otherwise, a virtual memory page may be resident on a disk or other block device. In other words, the virtual memory page may be paged out of physical memory, and instead, placed into paging space or a file system. Accordingly, a virtual memory page can be an abstraction of memory storage that decouples the physical media from the operating characteristics of the virtual memory page as used within an operating system. Such physical media is where the virtual memory page resides. The physical media is any storage mechanism, for example, random access memory, disk storage, tape storage, flash memory, among others.

SUMMARY

According to an embodiment described herein, a system can include a processor to, based on freeing of a last allocation on a first memory page, place the first memory page on a deferred disclaim list. The processor can also set a first hidden flag in a first page table entry corresponding to the first memory page.

According to another embodiment described herein, a method can include, based on freeing of a last allocation on a first memory page, placing, by a processor, the first memory page on a deferred disclaim list. The method can also include setting, by a processor, a first hidden flag in a first page table entry corresponding to the first memory page.

According to another embodiment described herein, an apparatus can include program code executable by a processor to, based on freeing of a last allocation on a first memory page, place the first memory page on a deferred disclaim list. The apparatus can also include program code executable by a processor to set a first hidden flag in a first page table entry corresponding to the first memory page.

DETAILED DESCRIPTION

Embodiments of deferred disclaim of memory pages are provided, with exemplary embodiments being discussed below in detail. When a virtual memory page is disclaimed, the operating system disconnects its virtual memory address from its assigned physical memory frame, thus freeing the physical memory frame to be reused for a different virtual memory address. If a virtual address has been disclaimed, any subsequent attempt to access that virtual address may cause a new physical memory page to be found, assigned and zeroed for the virtual address. Disclaiming of virtual memory may also cause thrashing, in which a virtual memory address is disclaimed from and then reallocated to a physical memory page repeatedly. A memory allocation subsystem in a computer system may not disclaim freed virtual memory pages for performance reasons; however, this may result in a reduced available memory.

Deferred disclaim of memory pages allows disclaiming to be performed based on a least recently used list, which may, in some embodiments, reduce the likelihood of a disclaim followed by a reallocation of a virtual memory address. Rather than disclaiming a page as soon as it is no longer used, or performing disclaim via a timer-based garbage collector, a deferred disclaim list may be maintained by a memory allocation subsystem (or allocator). The virtual addresses on the deferred disclaim list may be maintained in least recently used order. If there is an access to a virtual address that is on the deferred disclaim list, the virtual address may be accessed normally and removed from the deferred disclaim list. When a page replacement daemon (such as a least recently used daemon, or lrud) is run to replenish the free frame list, pages may be taken from a tail of the deferred disclaim list. In some embodiments, a plurality of deferred disclaim lists may be maintained by a memory allocation subsystem; each deferred disclaim list may correspond to a respective memory pool in the computer system. The allocator may add and remove pages from the deferred disclaim list(s) via, for example, a deferred disclaimed service.

In some embodiments, the deferred disclaim service may be triggered when the allocator frees a last allocation on a page and calls the deferred disclaim service. The deferred disclaim service may receive a virtual memory address with an optional parameter to specify the affinity domain from the allocator. If the affinity domain is specified, the deferred disclaim service may put the virtual memory address of the page on the appropriate memory pool's deferred disclaim list. Otherwise, the deferred disclaim service may look up the physical page's affinity domain based on the page's segment, and add the virtual memory address to the corresponding deferred disclaim list. In some embodiments, virtual memory addresses may be added to the head of the appropriate deferred disclaim list. A flag in the page table entry (PTE) corresponding to the page may be set to indicate that the virtual memory address is on the deferred disclaim list (e.g., set to HIDDEN). If the allocator subsequently accesses a virtual memory address corresponding to a page that is on the deferred disclaim list, the HIDDEN flag in the page's PTE may be reset, and the page may be removed from the deferred disclaim list. A page replacement daemon may periodically remove a page from the tail (i.e., the least recently used end) of the deferred disclaim list, reset the HIDDEN flag in the page's corresponding PTE, set a zero-fill flag on the page's virtual page descriptor, and add the freed page frame to a free list of the allocator. The physical memory may then be reallocated from the free list to a different virtual memory address.

Figure 1:
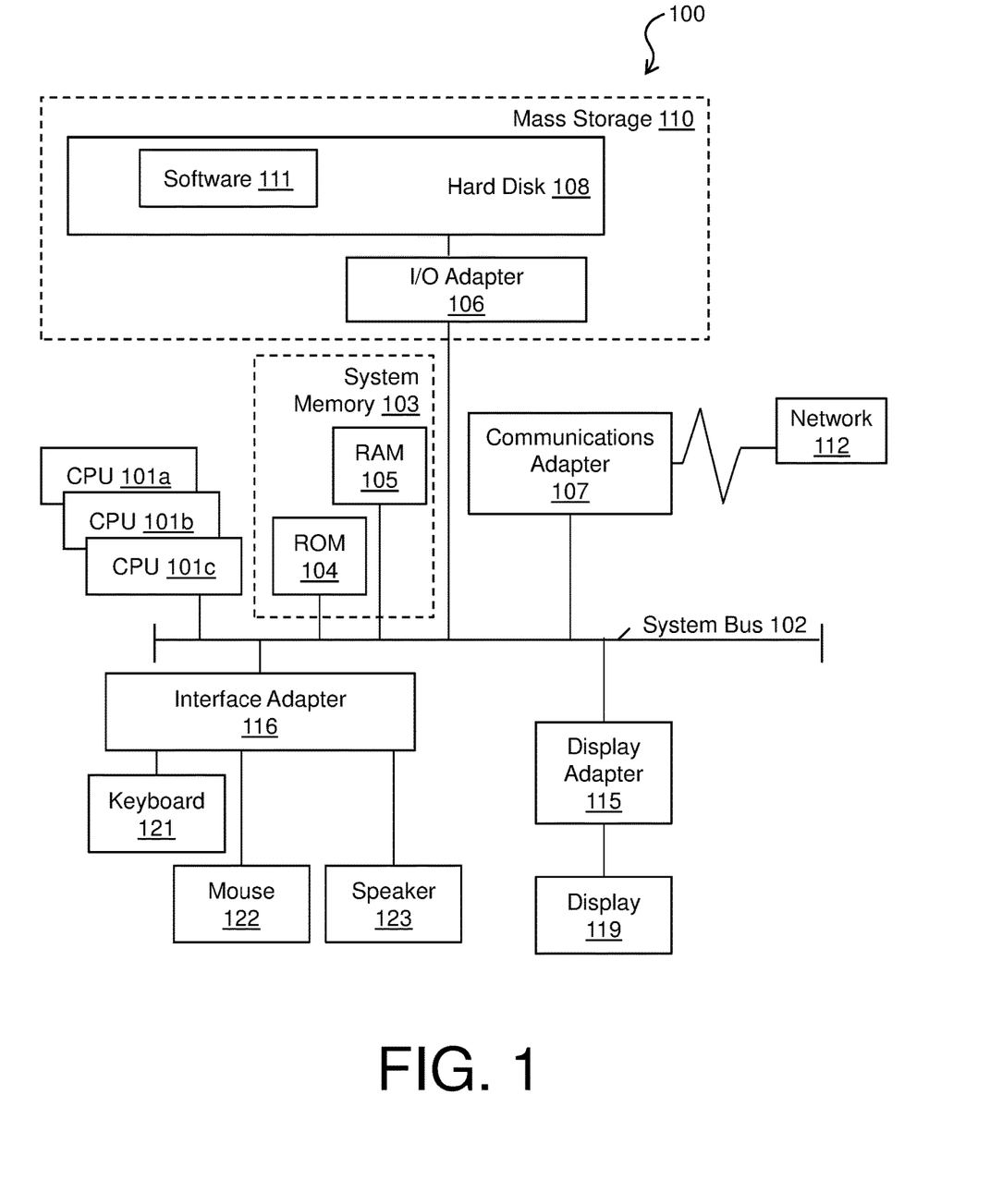
FIG. 1 is a block diagram of an example computer system for deferred disclaim of memory pages.

Turning now to FIG. 1, a computer system 100 is generally shown in accordance with an embodiment. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc. (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system, such as the z/OS or AIX operating system from IBM Corporation, to coordinate the functions of the various components shown in FIG. 1.

Additional input/output devices are shown as connected to the system bus 102 via a display adapter 115 and an interface adapter 116 and. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by a display adapter 115, which may include a graphics controller to improve the performance of graphics intensive applications and a video controller. A keyboard 121, a mouse 122, a speaker 123, etc. can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computing system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
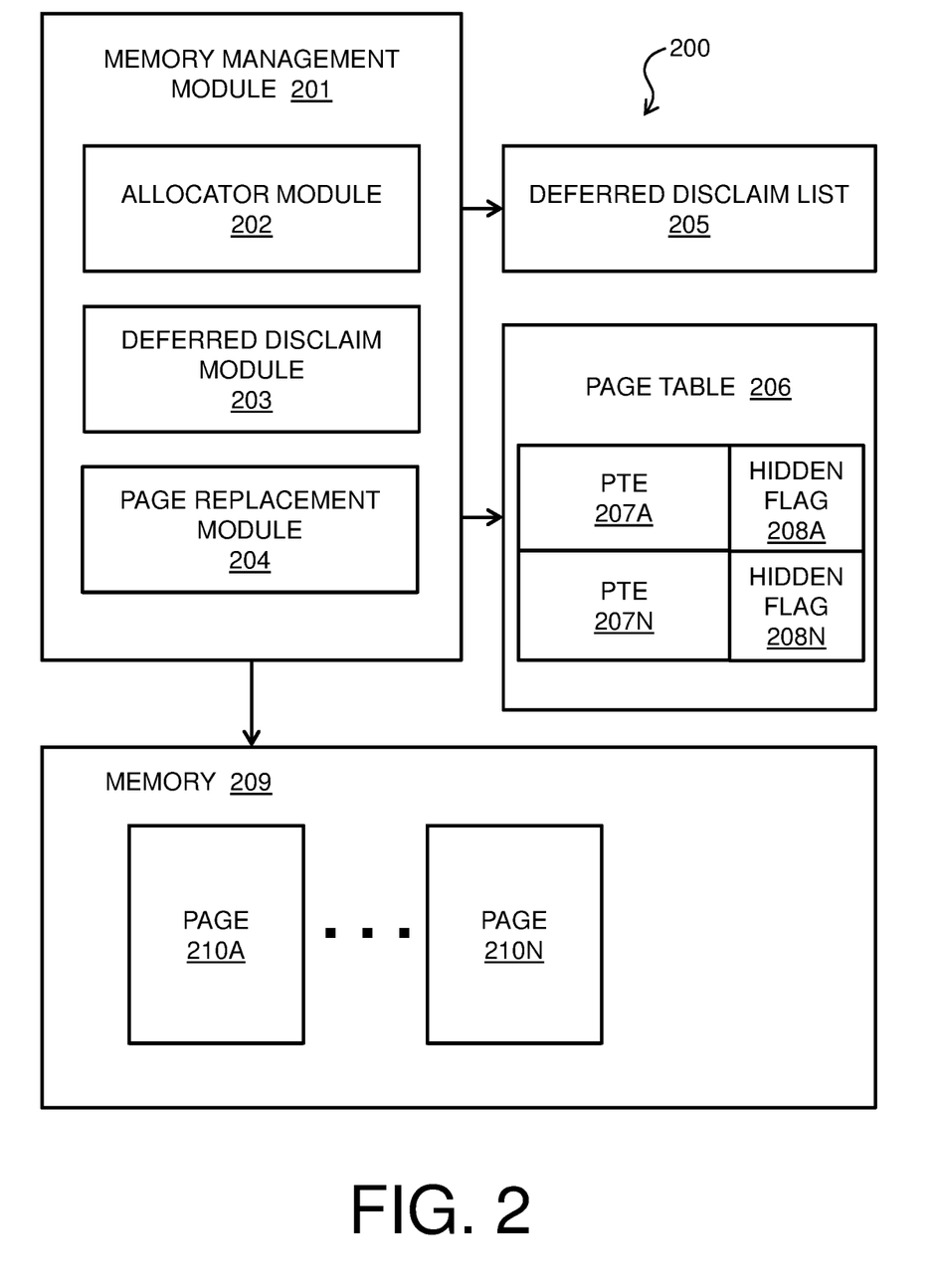
FIG. 2 is a block diagram of an example system for deferred disclaim of memory pages in a computer system.

FIG. 2 is a block diagram of an example system 200 for deferred disclaim of memory pages in a computer system such as computer system 100. System 200 includes a memory management module 201, which may be part of an operating system of a computer system 100. The memory management module 201 includes an allocator module 202, a deferred disclaim module 203, and a page replacement module 204. The system 200 further includes a deferred disclaim list 205. The deferred disclaim list 205 may include a list of least recently used memory pages (such as pages 210A-N in memory 209) that are available to be freed by the page replacement module 204. The system 200 further includes a page table 206, which comprises a plurality of page table entries (PTEs) 207A-N. Each PTE of PTEs 207A-N has a respective hidden flag 208A-N. A hidden flag 208A indicates whether the page corresponding to a PTE 207A is on the deferred disclaim list 205. Each of hidden flags 208A-N may be a single bit in some embodiments. The deferred disclaim list 205 and page table 206 may be stored in any appropriate memory location in a computer system 100 in various embodiments. The system 200 further includes a memory 209, which may correspond to system memory 103 and/or mass storage 110 of computer system 100 in various embodiments. The memory 209 comprises a plurality of memory pages 210A-N. Each of pages 210A-N may have a respective PTE 207A-N in page table 206. The memory 209 may include a plurality of memory pools in some embodiments; in such embodiments, each memory pool may have a respective deferred disclaim list 205. The operation of memory management module 201 of system 200 is discussed below with respect to FIGS. 3-5.

It is to be understood that the block diagram of FIG. 2 is not intended to indicate that the system 200 is to include all of the components shown in FIG. 2. Rather, the system 200 can include any appropriate fewer or additional components not illustrated in FIG. 2 (e.g., additional memory components, embedded controllers, modules, additional network interfaces, memory pools, deferred disclaim lists, page table entries, etc.). Further, the embodiments described herein with respect to system 200 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 3:
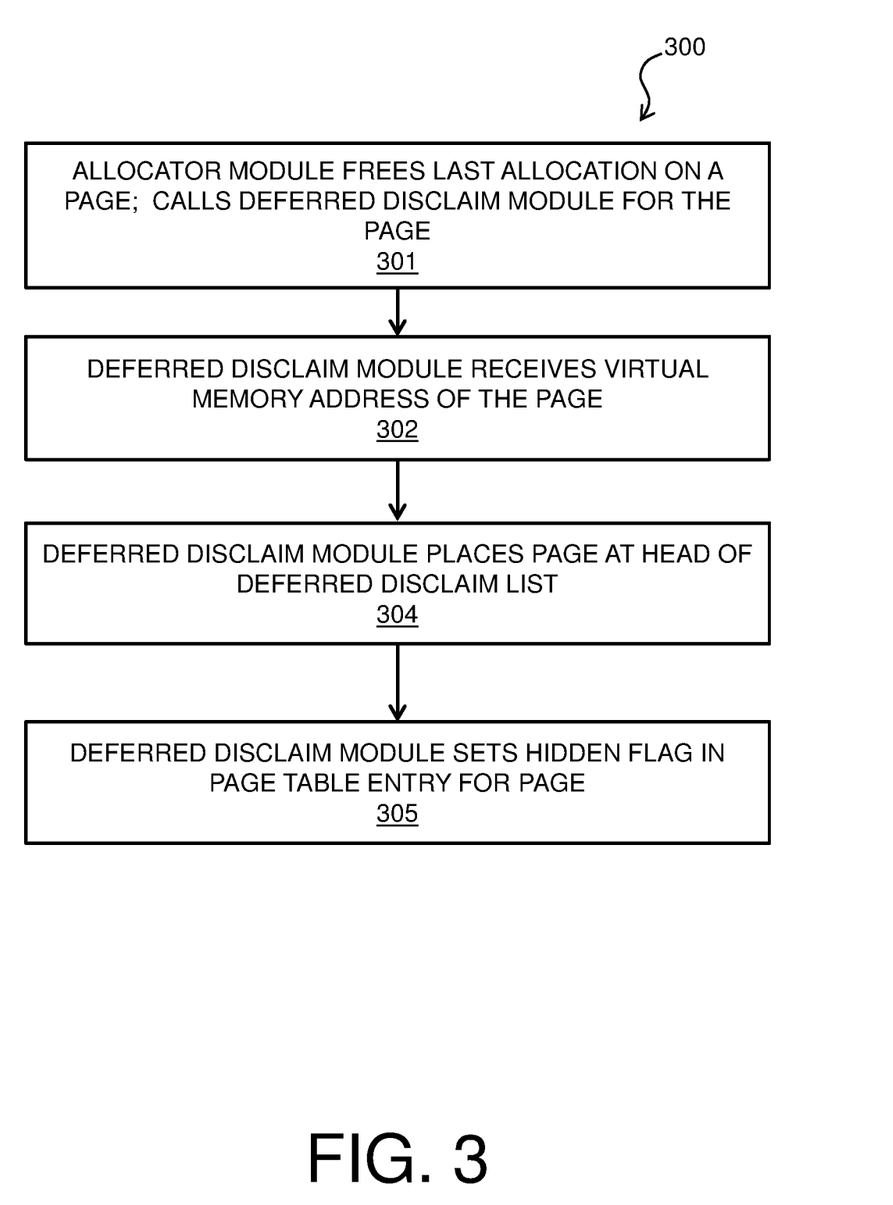
FIG. 3 is a process flow diagram of an example method for deferred disclaim of memory pages.

FIG. 3 is a process flow diagram of an example method 300 for deferred disclaim of memory pages. Method 300 of FIG. 3 may be implemented in system 200 of FIG. 2. In block 301 of method 300, allocator module 202 frees a last allocation on a memory page such as memory page 210A. Based on freeing the last allocation on the memory page 210A, the allocator module 202 calls the deferred disclaim module 203 for the memory page 210A. In block 302, the deferred disclaim module receives the virtual memory address of the memory page 201A via the call from the allocator module 202. In some embodiments, the call to the deferred disclaim module 203 includes an affinity domain of the memory page 210A.

In block 304, the deferred disclaim module 203 places the page 210A on the deferred disclaim list 205. In some embodiments, the system 200 includes a plurality of deferred disclaim lists such as deferred disclaim list 205, each of the plurality of deferred disclaim lists corresponding to a respective memory pool of a plurality of memory pools of the memory 209. In such embodiments, the deferred disclaim module places the page 210A on the particular deferred disclaim list 205 of the plurality of deferred disclaim lists that corresponds to the affinity domain of the page 210A. In embodiments in which the call to the deferred disclaim module 203 from the allocator module 202 does not include the affinity domain of the page 210A, the deferred disclaim module 203 may look up the affinity domain of the memory page 210A in block 304 based on, for example, a segment of the virtual memory address of the page 210A, and place the page 210A on the deferred disclaim list 205 that corresponds to the affinity domain of the memory page 210A. A deferred disclaim list 205 may hold entries for any appropriate number of memory pages. In some embodiments, entries corresponding to memory pages are added to the head of the deferred disclaim list 205 in block 304, and entries corresponding to memory pages are removed from the tail of the deferred disclaim list 205 (discussed below with respect to FIG. 5).

In block 305, the deferred disclaim module 203 sets a hidden flag 208A in a PTE 207A corresponding to the page 210A in the page table 206. The hidden flag 208A indicates that the page 210A corresponding to the PTE 207A is on the deferred disclaim list 205. Method 300 of FIG. 3 may be repeated whenever a memory page may be placed on the deferred disclaim list 205, e.g., method 300 may be triggered in an operating system of a computer system such as computer system 100 whenever an allocator module such as allocator module 202 frees a last allocation on a memory page such as memory page 210A.

The process flow diagram of FIG. 3 is not intended to indicate that the operations of the method 300 are to be executed in any particular order, or that all of the operations of the method 300 are to be included in every case. Additionally, the method 300 can include any suitable number of additional operations.

Figure 4:
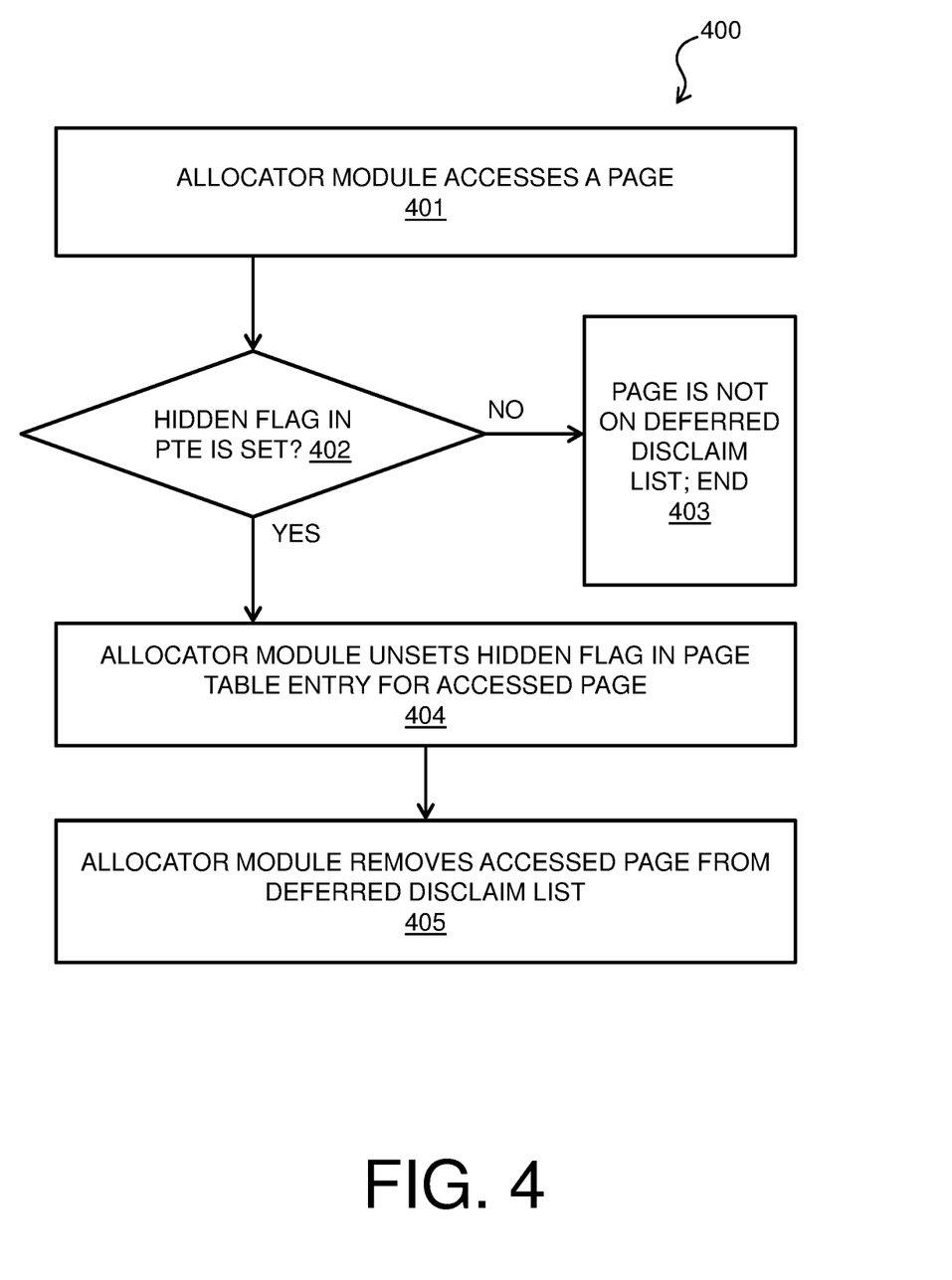
FIG. 4 is a process flow diagram of another example method for deferred disclaim of memory pages.

FIG. 4 is a process flow diagram of another example method 400 for deferred disclaim of memory pages. Method 400 of FIG. 4 may be implemented in system 200 of FIG. 2. In block 401, the allocator module 202 accesses a memory page such as page 210A during execution of software (such a software 111), and accesses the PTE 207A corresponding to the page 210A in the page table 206. In block 402, it is determined whether the hidden flag 208A in the PTE 207A is set. If it is determined that the hidden flag 208A is not set, flow proceeds from block 402 to block 403, in which the page 210A is determined not to be on the deferred disclaim list 205, the access to page 210A proceeds, and method 400 ends.

If it is determined in block 402 that the hidden flag 208A is set, flow proceeds from block 402 to block 404. In block 404, the allocator module 202 unsets the hidden flag 208A in the PTE 207A corresponding to the page 210A. In block 405, the allocator module 202 removes the page 210A from the deferred disclaim list 205, and the access to the memory page 210A proceeds. In embodiments in which there are a plurality of deferred disclaim lists, each corresponding to a respective memory pool, the allocator module 202 determines the deferred disclaim list from which to remove the page 210A based on the affinity domain of the page 210A. Method 400 of FIG. 4 may be repeated whenever a memory page (e.g., any of pages 210A-N) is accessed during execution of software 111 on a computer system 100.

The process flow diagram of FIG. 4 is not intended to indicate that the operations of the method 400 are to be executed in any particular order, or that all of the operations of the method 400 are to be included in every case. Additionally, the method 400 can include any suitable number of additional operations.

Figure 5:
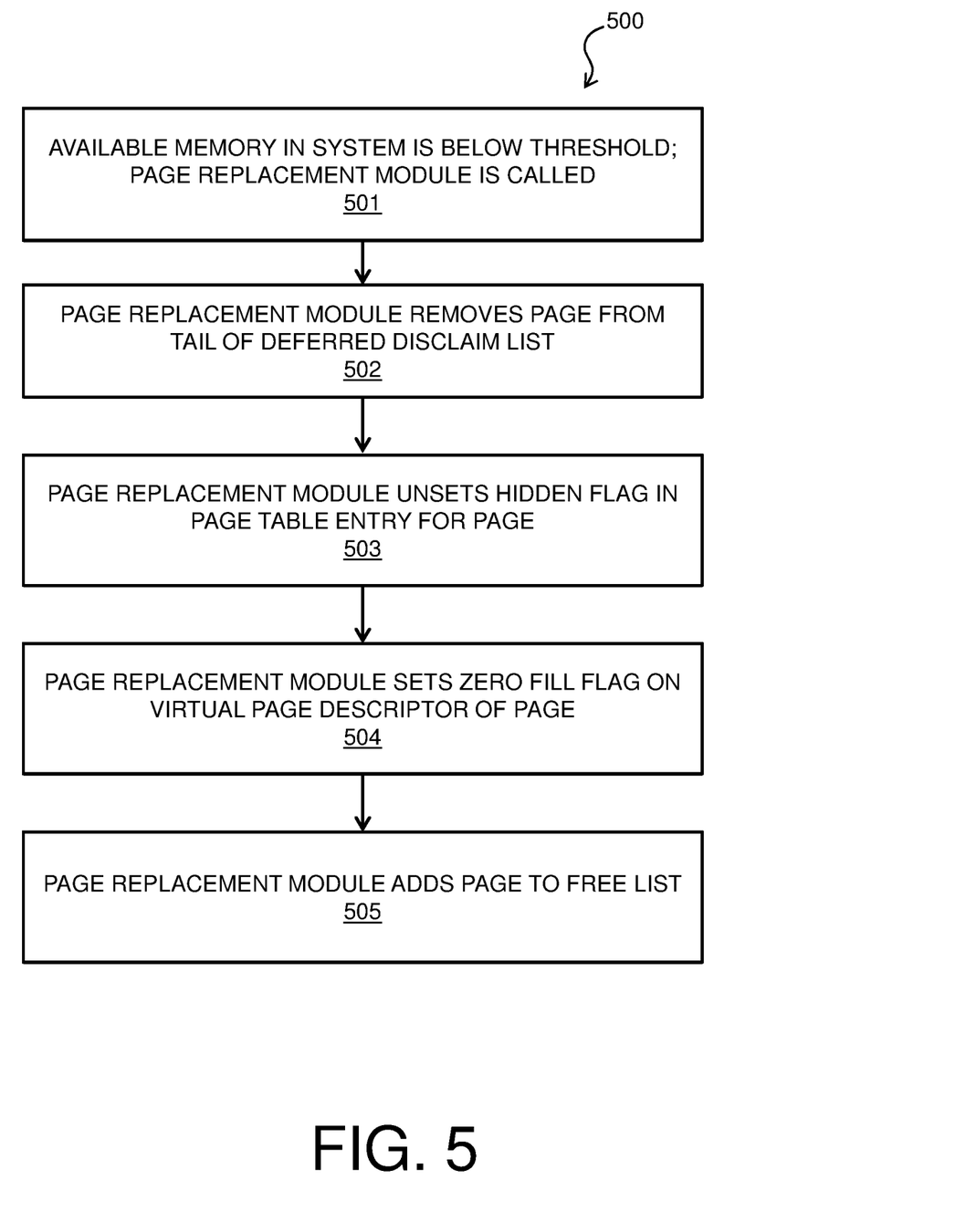
FIG. 5 is a process flow diagram of another example method for deferred disclaim of memory pages.

FIG. 5 is a process flow diagram of another example method 500 for deferred disclaim of memory pages. Method 500 of FIG. 5 may be implemented in system 200 of FIG. 2. In block 501 of method 500, it is determined that the available memory (e.g., number of pages on a free list) in a computer system 100 is low, e.g., below a threshold. The determination of block 501 may be made by, for example, an operating system of a computer system 100. Based on determining that the available memory is low in block 501, a page replacement module 204 is called to free up memory in the computer system 100. In block 502, the page replacement module 204 removes an entry corresponding to a least recently used memory page (such as page 210A) from the tail of the deferred disclaim list 205. In block 503, the page replacement module 204 unsets a hidden flag 208A in a page table entry 207A in page table 206 corresponding to the page 210A that was removed from the deferred disclaim list 205 in block 502. In block 504, the page replacement module 204 sets a zero fill flag on a virtual page descriptor of the page 210A, in order to remove any old data from the page 210A before reuse of the page 210A. In block 505, the page replacement module 204 adds the freed page 210A to a free list. The allocator module 202 may then reallocate the page 210A from the free list for use by another virtual address in the computer system. Method 500 of FIG. 5 may be repeated by, for example, an operating system of a computer system 100 whenever it is determined that the available memory in the computer system 100 is low, in order to add one or more memory pages to the free list that are available for reallocation.

The process flow diagram of FIG. 5 is not intended to indicate that the operations of the method 500 are to be executed in any particular order, or that all of the operations of the method 500 are to be included in every case. Additionally, the method 500 can include any suitable number of additional operations.

The present techniques may be a system, a method or an apparatus. The flowchart and block diagrams in the Figures illustrate the architecture, functionality, and operation of possible implementations of systems, methods, and apparatus according to various embodiments of the present techniques. In this regard, each block in the flowchart or block diagrams may represent a module, segment, or portion of logic for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising a processor configured to:
based on freeing of a last allocation on a first memory page:
place the first memory page on a deferred disclaim list; and
set a first hidden flag in a first page table entry corresponding to the first memory page; and
based on accessing a second memory page:
determine whether a second hidden flag in a second page table entry corresponding to the second memory page is set;
based on determining that the second hidden flag in the second page table entry is not set, determine that the second memory page is not on the deferred disclaim list; and
based on determining that the second hidden flag in the second page table entry is set, determine that the second memory page is on the deferred disclaim list.

2. The system of claim 1, wherein placing the first memory page on the deferred disclaim list comprises:
determining an affinity domain of the first memory page based on a virtual address of the first memory page; and
placing the virtual address of the first memory page on the deferred disclaim list corresponding to the affinity domain of the first memory page, wherein the system comprises a plurality of deferred disclaim lists, each of the deferred disclaim lists corresponding to a respective affinity domain.

3. The system of claim 1, the processor configured to:
based on determining that the second memory page is on the deferred disclaim list:
unset the second hidden flag in the second page table entry; and
remove the second memory page from the deferred disclaim list.

4. The system of claim 1, the processor configured to:
based on determining that available memory in the system is below a threshold:
remove a third memory page from the deferred disclaim list; and
unset a third hidden flag in a third page table entry corresponding to the third memory page.

5. The system of claim 4, the processor configured to:
based on removing the third memory page from the deferred disclaim list:
set a zero fill flag in a virtual page descriptor corresponding to the third memory page; and
add the third memory page to a free list.

6. The system of claim 4, wherein the first memory page is added to a head of the deferred disclaim list, and the third memory page is removed from a tail of the deferred disclaim list.

7. A computer-implemented method, comprising:
freeing, by a processor, a last allocation on a first memory page;
based on the freeing of the last allocation on the first memory page:
placing, by the processor, the first memory page on a deferred disclaim list; and
setting, by the processor, a first hidden flag in a first page table entry corresponding to the first memory page;

accessing a second memory page by the processor; and based on accessing the second memory page by the processor:

determine whether a second hidden flag in a second page table entry corresponding to the second memory page is set;

based on determining that the second hidden flag in the second page table entry is not set, determine that the second memory page is not on the deferred disclaim list; and based on determining that the second hidden flag in the second page table entry is set, determine that the second memory page is on the deferred disclaim list.

8. The computer-implemented method of claim 7, wherein placing the first memory page on the deferred disclaim list comprises:

determining an affinity domain of the first memory page based on a virtual address of the first memory page;

determining the deferred disclaim list from a plurality of deferred disclaim lists, each of the plurality of deferred disclaim lists corresponding to a respective affinity domain; and placing the virtual address of the first memory page on the deferred disclaim list corresponding to the affinity domain of the first memory page.

9. The computer-implemented method of claim 7, comprising:

based on determining that the second memory page is on the deferred disclaim list:

unset the second hidden flag in the second page table entry; and remove the second memory page from the deferred disclaim list.

10. The computer-implemented method of claim 7, comprising:

based on determining by the processor that available memory is below a threshold:

remove a third memory page from the deferred disclaim list; and unset a third hidden flag in a third page table entry corresponding to the third memory page.

11. The computer-implemented method of claim 10, comprising:

based on removing the third memory page from the deferred disclaim list:

set a zero fill flag in a virtual page descriptor corresponding to the third memory page; and add the third memory page to a free list.

12. The computer-implemented method of claim 10, wherein the first memory page is added to a head of the deferred disclaim list, and the third memory page is removed from a tail of the deferred disclaim list.

13. A computer program product comprising a non-transitory computer readable storage medium having program instructions embodied therewith, the program instructions executable by one or more processors to cause the one or more processors to perform operations comprising:

based on freeing of a last allocation on a first memory page:

placing the first memory page on a deferred disclaim list; and setting a first hidden flag in a first page table entry corresponding to the first memory page; and based on accessing a second memory page:

determining whether a second hidden flag in a second page table entry corresponding to the second memory page is set;

based on determining that the second hidden flag in the second page table entry is not set, determining that the second memory page is not on the deferred disclaim list; and based on determining that the second hidden flag in the second page table entry is set, determining that the second memory page is on the deferred disclaim list.

14. The computer program product of claim 13, wherein placing the first memory page on the deferred disclaim list comprises:

determining an affinity domain of the first memory page based on a virtual address of the first memory page; and placing the virtual address of the first memory page on the deferred disclaim list corresponding to the affinity domain of the first memory page, wherein the system comprises a plurality of deferred disclaim lists, each of the deferred disclaim lists corresponding to a respective affinity domain.

15. The computer program product of claim 13, wherein the operations further comprise:

based on determining that the second memory page is on the deferred disclaim list:

unsetting the second hidden flag in the second page table entry; and removing the second memory page from the deferred disclaim list.

16. The computer program product of claim 13, wherein the operations further comprise:

based on determining that available memory in the system is below a threshold:

removing a third memory page from the deferred disclaim list; and unsetting a third hidden flag in a third page table entry corresponding to the third memory page.

17. The computer program product of claim 16, wherein the operations further comprise:

based on removing the third memory page from the deferred disclaim list:

setting a zero fill flag in a virtual page descriptor corresponding to the third memory page; and adding the third memory page to a free list.

18. The computer program product of claim 16, wherein the first memory page is added to a head of the deferred disclaim list, and the third memory page is removed from a tail of the deferred disclaim list.

\* \* \* \* \*